United States Patent [19]

Lehmann

[11] 4,155,722
[45] May 22, 1979

[54] DEVICE FOR SEPARATING ISOTOPES

[75] Inventor: Jean-Claude Lehmann, Paris, France

[73] Assignee: Compagnie Generale d'Electricite, Paris, France

[21] Appl. No.: 643,652

[22] Filed: Dec. 23, 1975

[30] Foreign Application Priority Data

Jan. 15, 1975 [FR] France .............................. 75 01174

[51] Int. Cl.² ............................................. B03C 3/00
[52] U.S. Cl. ........................................... 55/2; 55/102; 55/154; 204/DIG. 11; 204/157.1 R; 250/423 P
[58] Field of Search ............. 250/423 P; 204/157.1 R, 204/DIG. 11; 55/2, 101, 102, 154

[56] References Cited

U.S. PATENT DOCUMENTS

| | | | |
|---|---|---|---|
| 2,939,006 | 5/1960 | Oswald | 55/102 |
| 3,443,087 | 5/1969 | Robieux et al. | 250/290 |
| 3,558,877 | 1/1971 | Pressman | 204/DIG. 11 |
| 3,914,655 | 10/1975 | Dreyfus et al. | 250/423 P |
| 3,937,956 | 2/1976 | Lyon | 55/2 |
| 3,944,825 | 3/1976 | Levy et al. | 204/157.1 R |

FOREIGN PATENT DOCUMENTS 2312194 10/1973 Fed. Rep. of Germany ............... 55/2

Primary Examiner—Bernard Nozick
Attorney, Agent, or Firm—Sughrue, Rothwell, Mion, Zinn and Macpeak

[57] ABSTRACT

The invention concerns a device for separating isotopes. A gas containing the isotopes to be separated is excited by a radiation having an intermediate frequency between the central frequencies of the two absorption lines of the two isotopes, those two lines coinciding partly by Doppler enlarging, so as to make it possible to separate subsequently the excited molecules according to the direction of their motion. Application to isotopic enriching.

8 Claims, 3 Drawing Figures

DEVICE FOR SEPARATING ISOTOPES

The invention concerns a device for separating isotopes. It is known that the devices presently used for separating isotopes, more particularly the isotopes U238 and U235 of uranium, are expensive. That is why there have been proposed other devices, in which a light beam supplied by a laser selectively excites molecules of a single isotope within a gas containing the two isotopes to be separated; it is then relatively easy to separate the excited molecules from those which are not excited. The disadvantage of such devices, in the case of molecular gases, is due to the fact that it is generally difficult to find an absorption on line of one of the isotopes sufficiently different from all the absorption lines of the other isotope for it to be possible to excite the first isotope without exciting the second. This is due to the existence of numerous absorption lines in the spectra of two isotopes and to the width of those lines. In usual conditions, that width is due mostly to the Doppler effect which shifts the absorption frequencies upwards or downwards according to whether the molecules are moved, by thermal agitation, in the direction of propagation of the light or in the opposite direction.

The Doppler width LD, that is, the line width due to the Doppler effect, decreases when the temperature lowers and is cancelled at absolute zero. The absorption lines then have a residual width, called the natural width, LN, which is generally very much smaller than the Doppler width LD in usual conditions.

The aim of the present invention is to produce a device for separating isotopes when two isotopes to be separated each have an absorption line such that the difference between the two lines is less than their Doppler width while being greater than their natural width.

It has as its object a device for separating isotopes, comprising:

Means for putting a first and a second isotope which are to be separated in the form of a gas;

A source of monochromatic excitation light to excite the gaseous molecules of those two isotopes in a distinct manner;

A first and a second receiver for collecting selectively the molecules of the first and of the second isotope thus excited in a distinct manner, respectively; characterized in that the frequency FL of the said excitation light is chosen between a lower limit and an upper limit depending on the frequencies F1, F2, of two neighbouring absorption lines of that first and that second isotope, the difference DF between those two frequencies F1 and F2 being less than the Doppler width LD of each of those lines and being greater simultaneously than the natural width LN of each of those two lines and the line width LR of the said source of excitation light, the said lower limit $F1 - \frac{1}{2}LD$ being equal to the smaller F1 of the said two absorption line frequencies reduced by half the Doppler width LD, and the said upper limit $F2 + \frac{1}{2}LD$ being equal to the greater of the said two absorption line frequencies F2 increased by half the said Doppler width LD, whereby the probability of excitation of the said molecules by that light depends to a great extent on the directions of their motion; which directions are different for the two isotopes; A source of ionization light LI being arranged so as to irradiate the place of interaction between the said excitation light and the said gaseous molecules with an ionization light suitable for ionizing the molecules which are excited without ionizing the molecules which are not excited; The said receivers being suitable for collecting selectively the ionized molecules; The said first receiver being placed so that, at the said place of interaction, the molecules of the first isotope going towards that first receiver be more probably excited by the said excitation light than the molecules of that first isotope going towards the second receiver and the same not being true for the molecules of the second isotope; The pressure of the said gas being chosen so as to be sufficiently low for the distance between the said place of interaction and the said first receiver to be less than twice the average free travel of the molecules within that gas.

With reference to the accompanying diagrammatic FIGS. 1 and 2, an embodiment of the invention having no limiting character will be described hereinbelow.

Figure 1:
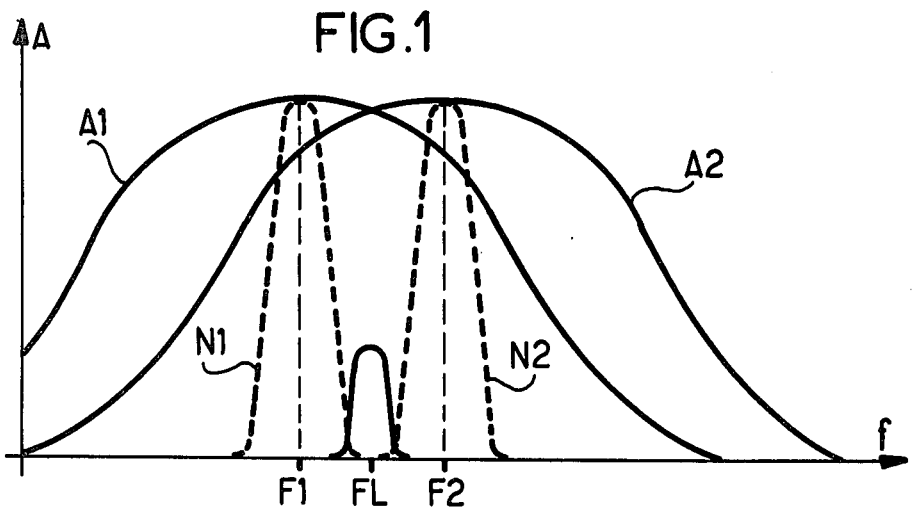
FIG. 1 is a diagram of the variations in the coefficient of absorption A of a monochromatic light by gaseous molecules containing the isotopes to be separated as a function of the frequency f of that light.

In FIG. 1, the curves A1 and A2 show the variations of the coefficient of absorption of a monochromatic light corresponding to two lines of a gas containing a first and a second isotope I1 and I2 respectively.

Those curves have a great width at half their maximum height, this width corresponding to the Doppler line width LD, at the temperature chosen for effecting the separation.

The curves N1 and N2 represent the variations of the same coefficients of absorption when there is no Doppler effect, that is, they show at half the maximum height the natural widths of the same lines. It may be assumed, to simplify the description, that those widths are equal and they will be designated by LN. If they are not equal, the width taken into consideration will be the greatest of these latter. The central frequencies F1 and F2 of the two lines have a difference $DF = F2 - F1$, which is less than the Doppler line width LD and greater than the natural width LN. Taking into account the fact that the frequency shift by Doppler effect is connected with the relative velocity of each molecule in relation to light, it ensues from the above description that if the gas in question is made to interact with a monochromatic light whose frequency FL is intermediate between the frequencies F1 and F2, the probability of excitation of a gaseous molecule will depend greatly on the direction of its motion at the instant of interaction. A molecule of an isotope will have a great probability of excitation if it has a suitable speed component in the direction of propagation of the light. A molecule of the other isotope will have a great probability of excitation if it has a suitable speed component in the direction opposite to that of the propagation of the light.

That difference in behaviour between the molecules of the two isotopes will subsist if a light whose frequency is outside the range of frequencies F1, F2, but sufficiently close to one of those frequencies, is used, that is, in practice, if the frequency of that light remains comprised within the range between the frequency $F1 - \frac{1}{2}LD$ and the frequency $F2 + \frac{1}{2}LD$. In the latter case, the molecules of the two isotopes which are the most probably excited will have speed components in the same direction along the axis of propagation of the light, but those components will be clearly different in magnitude.

In all cases, considering the fact that the gaseous molcules have, when in thermal equilibrium, absolute velocities close to each other, the molecules which are the most probably excited will have velocities forming a determined angle with the direction of propagation of the light, that is, an angle in any direction on a cone of revolution about that direction. The angle at the top of that cone will differ according to which of the two isotopes the molecules contain.

According to the present invention, at least one receiver arranged, in relation to the place of interaction, so that the molecules containing one of the isotopes have a great probability of excitation when they go towards it at the instant of interaction. Almost immediately after their excitation, those molecules are ionized by a light whose wavelength is chosen so as to ensure the ionizing of those excited molecules without ionizing the molecules which are not excited. That ionizing practically does not modify the direction of propagation of the molecules.

The receiver can be one of very various kinds. If, for example, it is chemical, it will be chosen so as to fix the ionized molecules and not to fix the molecules which have not been ionized. It can also be of an electric kind.

For the receiver to receive preferentially the molecules which have been in a certain shift direction at the time of the interaction with the excitation light, it is necessary for those molecules to maintain that direction of motion until in the vicinity of the receiver, that is, the distance between the place of interaction and the receiver must not be too much greater than the average free travel of the molecules in the gas. In practice, the pressure is chosen so that this distance be less than twice the average free travel of the molecules.

For the excitation to depend greatly on the isotope and on the direction of propagation, the line width of the light source must be sufficiently small, that is, in practice, less than the difference in frequencies between the absorption lines of the two isotopes.

Figure 2:
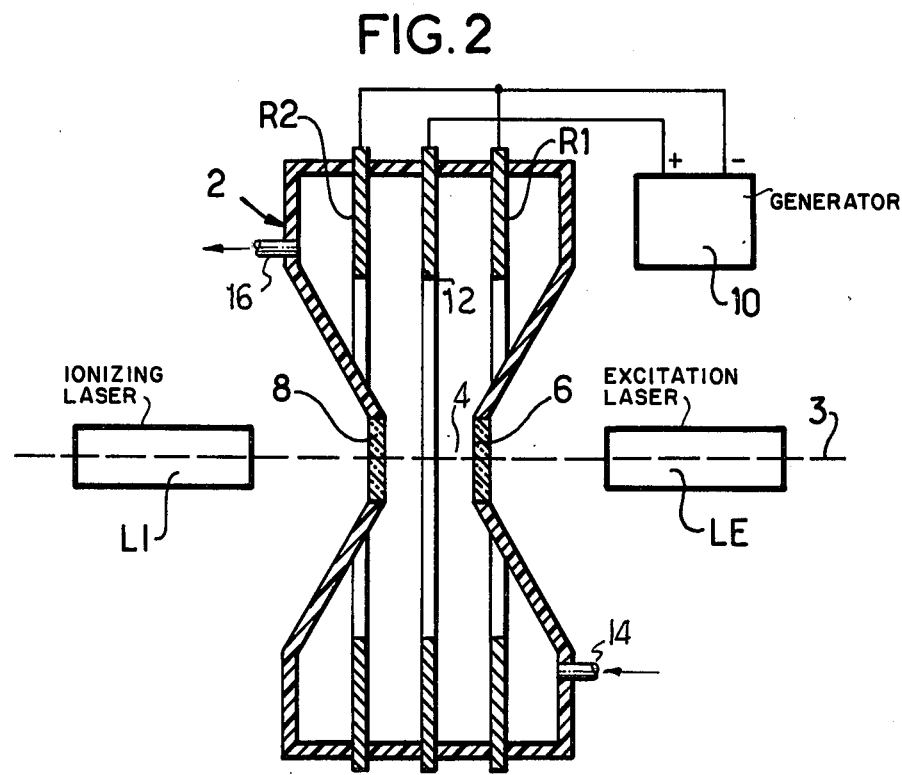
FIG. 2 is a cross-section view of a device according to the invention.

FIG. 2 shows a device according to the invention in which the receivers act by electrical attraction. An enclosure 2 formed by insulating walls, has a symmetry of revolution about an axis 3 and comprises an axial interaction chamber 4 situated between two ports 6 and 8 perpendicular to the axis 3 and being transparent to the radiations used. That chamber receives a gas containing the isotopes to be separated, at a suitable pressure. The gas may be introduced and removed from the chamber by any conventional inlet and outlet means, such as the inlet line 14 and the outlet line 16. An excitation laser LE sends out an axial excitation beam in the interaction chamber 4 through the port 6. A first receiver R1 and a second receiver R2 each having the shape of a metal ring having a symmetry of revolution about the axis 3, are arranged in the enclosure 2, about an interaction chamber 4 and are maintained at a negative electric potential by a generator 10. An anode 12 is arranged in the enclosure 2 between the receivers R1 and R2 and is brought to a positive potential by the generator 10. The receivers R1 and R2 are arranged, in relation to the interaction chamber 4 so that the gaseous molecules which are the most probably excited by the light of the laser LE be those which, at the time of their interaction with that light, go towards the receiver R1 if they contain the isotope I1 and those which go towards the receiver R2 if they contain the isotope I2.

A short time after their excitation, those molecules are ionized selectively by a light beam sent into the chamber 4 by a source of ionization light LI, which is generally ultra-violet, through the window 8. That ionization enables them to be collected by the receivers R1 and R2.

The pressure in the enclosure 2 is chosen such that the ionized molecules generally will not be subjected to any shock between the interaction chamber 4 and the receivers R1 and R2. The width of the chamber 4 along the axis 3 is chosen such that the greater part of the light energy supplied by the laser LE be absorbed in that chamber.

In a particular case of embodiment of the invention, the isotopes I1 and I2 to be separated are the isotopes 78 and 80 of selenium, respectively. They are put in the form of diatomic gaseous selenium molecules, it being understood that the device according to the invention enables the separating of the homogeneous molecules of one of the isotopes from the homogeneous molecules of the other isotope, that is, 78 Se 2 and 80 Se 2, a a pressure of 25 millitorrs, at a temperature of 250° C., in an interaction chamber having a length of 1.5 cm.

The transitions used for the excitation are:

B1u-X1g 2–13 R (66) for the isotope 78;

and

B1u-X1g 0–12 R (15) for the isotope 80.

The natural widths of the two corresponding absorption lines are close to 10 Mc/s. They have wavelengths which are very close to 4.765 Angstroms.

Their Doppler widths are equal to $LD = 1000$ Mc/s approximately.

A known monomodal frequency-stabilized ionized argon type laser LE supplying a light having a wavelength which is adjustable about 4.765 Angstroms with a line width of 10 Mc/s is used for the excitation.

To implement the invention, that wavelength can previously be made to vary until a value which makes it possible to obtain an optimum separation is reached. Nevertheless, it is generally more convenient to effect that previous adjustment by observing the intensity of the fluorescence light re-emitted by the gas.

For that purpose, firstly, the wavelength of the excitation laser is made to vary around 4.765 Angstroms in a fairly wide range to include the two previously mentioned lines. That range corresponds, for example, to three times the Doppler width. The intensity of the visible fluorescence light emitted by the gas under the action of the radiation of that laser is observed at the same time. That intensity is firstly very weak. It increases greatly on approaching the wavelength to be used, passes through a first maximum (corresponding to the frequency F1) then through a minimum (corresponding to the frequency FL), then through a second maximum (corresponding to the frequency F2) and again becomes very weak. The adjustment corresponding to the abovesaid minimum is then chosen for the excitation laser.

An ultra-violet source ensuring the virtually immediate photo-ionization of the excited molecules, that is, which are in the state B1u without ionizing the molecules which are not excited greatly, that is, which are in the state X1g is used for ionizing. For that purpose, the light of that source is filtered so as to obtain a suitable cut-out frequency.

The receivers R1 and R2 are arranged so as to receive the molecules whose direction of motion in the chamber 4 forms, with the direction of propagation of the excitation light, symmetrical angles a1 and a2, respectively, which are adjusted experimentally so that each of them collects a maximum of one of the isotopes.

The distance between the receivers R1 and R2 and the interaction chamber 4 is about 1.5 cm.

I claim:

1. A method for separating isotopes of a gaseous mixture of first and second molecules of first and second isotopes, respectively, of an element, the two isotopes having different optical absorption lines which overlap each other because of the Doppler widening effect caused by the thermal shifts of the molecules, comprising the steps of:

subjecting the gaseous mixture to optical radiation which has a wavelength falling in the range of overlap of the absorption lines and which excites selected ones of both of said molecules, such that the first molecules containing the first isotope and having a thermal shift at a first angle relative to the direction of propagation of the radiation are excited and then travel along a first path relative to said direction of propagation, and such that the second molecules containing the second isotope and having a thermal shift at a second angle relative to said direction of propagation of the radiation are excited and then travel along a second path at the second angle relative to said direction of propagation;

ionizing both the excited first and second molecules without ionizing non-excited molecules;

collecting at a point along the first path only the ionized, excited first molecules; and removing un-ionized molecules from the mixture.

2. The method defined in claim 1 further comprising the step of choosing the distance between the point at which the radiation excites the molecules and said collecting point on said first path to be less than twice the average free travel of the molecules in the gaseous mixture.

3. The method defined in claim 1 further comprising the step of choosing the frequency of said radiation to be between $F1 - \frac{1}{2}LD$ and $F2 + \frac{1}{2}LD$, where $F1 < F2$, $F1$ and $F2$ are the respective center frequencies of the two absorption lines, and LD is the Doppler-expanded width of the absorption lines.

4. The method defined in claim 3 further comprising the step of choosing the frequency of said radiation to be between $F1$ and $F2$.

5. The method defined in claim 1 further comprising the step of collecting at a point along said second path only the ionized, excited second molecules.

6. The method defined in claim 5 wherein said first and second paths are defined by conical surfaces of revolution around the axis of the propagation path of the radiation, the surfaces having respective vertices located at the same point on the axis and having vertex angles equal to twice said first and second angles, respectively.

7. Apparatus for separating two isotopes in a gaseous mixture of first and second molecules containing respectively these two isotopes and having accordingly two respective different optical absorption lines which overlap each other because of the Doppler effect related to the thermal shifts of these molecules, said apparatus comprising:

an enclosure for containing said gaseous mixture, said enclosure having a window for permitting local interaction of light from outside with said gaseous mixture at an inner limited interaction place within said enclosure;

means for providing a monochromatic excitation parallel light beam having an axis intersecting the center point of said interaction place, the wavelength of this beam being in the overlapping range of said two absorption lines, and for exciting through said window both said first and second molecules at said interaction place, whereby, among said first and second molecules, excitation probability is greater for the molecules the thermal shifts of which make respectively a first and a second angle with said axis, the most probably excited first and second molecules escaping accordingly thereafter from said interaction place substantially along respective first and second paths defined respectively by first and second conical surfaces of revolution about the axis of the beam with said center point as a common vertex and with said first and second angles being equal to one-half the vertex angles, respectively, of the two surfaces;

ionizing means for ionizing both said first and second excited molecules without ionizing non-excited molecules;

at least a first receiver disposed in said enclosure at a point along said first path for selectively collecting the ionized, excited first molecules travelling along said first conical surface;

a second receiver disposed in said enclosure at a point along said second path for selectively collecting the ionized, excited second molecules travelling along said second conical surface;

wherein said first and second receivers are negatively charged metal rings located respectively in said first and second paths and coinciding with said first and second conical surfaces, respectively, said rings being mounted in said enclosure so they are coaxial with said axis of said beam;

means for introducing said gasous mixture into said enclosure; and means for removing the un-ionized non-excited molecules from said enclosure.

8. The apparatus defined in claim 7 wherein said means for providing said light beam is an adjustable frequency laser.

* * * * *